(12) United States Patent
Gallia

(10) Patent No.: US 6,209,726 B1
(45) Date of Patent: Apr. 3, 2001

(54) SCREEN ASSEMBLY FOR VIBRATORY SCREENING MACHINE

(76) Inventor: Robert L. Gallia, 3846 San Roque Creek, Corpus Christi, TX (US) 78410

( * ) Notice: Subject to any disclaimer, the term of this patent is extended or adjusted under 35 U.S.C. 154(b) by 0 days.

(21) Appl. No.: 09/340,594

(22) Filed: Jun. 28, 1999

(51) Int. Cl.⁷ ..................................................... B07B 1/49
(52) U.S. Cl. .................. 209/397; 209/275; 209/392; 209/403; 209/405
(58) Field of Search ................... 209/275, 392, 209/405, 397, 403; 156/308.2

(56) References Cited

U.S. PATENT DOCUMENTS

| | | | |
|---|---|---|---|
| 4,033,865 | * 7/1977 | Derrick, Jr. | 209/275 |
| 4,575,421 | 3/1986 | Derrick | 209/397 |
| 5,221,008 | 6/1993 | Derrick | 209/269 |
| 5,330,057 | 7/1994 | Schiller | 209/392 |
| 5,417,859 | 5/1995 | Bakula | 210/388 |
| 5,673,797 | 10/1997 | Bakula | 209/392 |
| 5,876,552 | * 3/1999 | Bakula | 156/308.2 |

* cited by examiner

Primary Examiner—Donald P. Walsh
Assistant Examiner—Mark J. Beauchaine
(74) Attorney, Agent, or Firm—G. Turner Moller

(57) ABSTRACT

A screen assembly for a conventional vibratory screening machine includes an upper fine mesh screen which passes particles below a predetermined size and rejects particles above this size. A second or blinding screen, below the first screen, acts to dislodge particles caught in the mesh of the first screen. A load bearing assembly supports the first and second screens and includes a first support screen coarser than the screens above it, a perforate plastic mesh and a second support screen coarser than the first support screen. The assembly is placed in a heated press which softens the plastic and then bonds the screens together. In a second embodiment of the invention, an undulating screen assembly is bonded to a support which comprises one or more screens of coarser mesh.

10 Claims, 1 Drawing Sheet

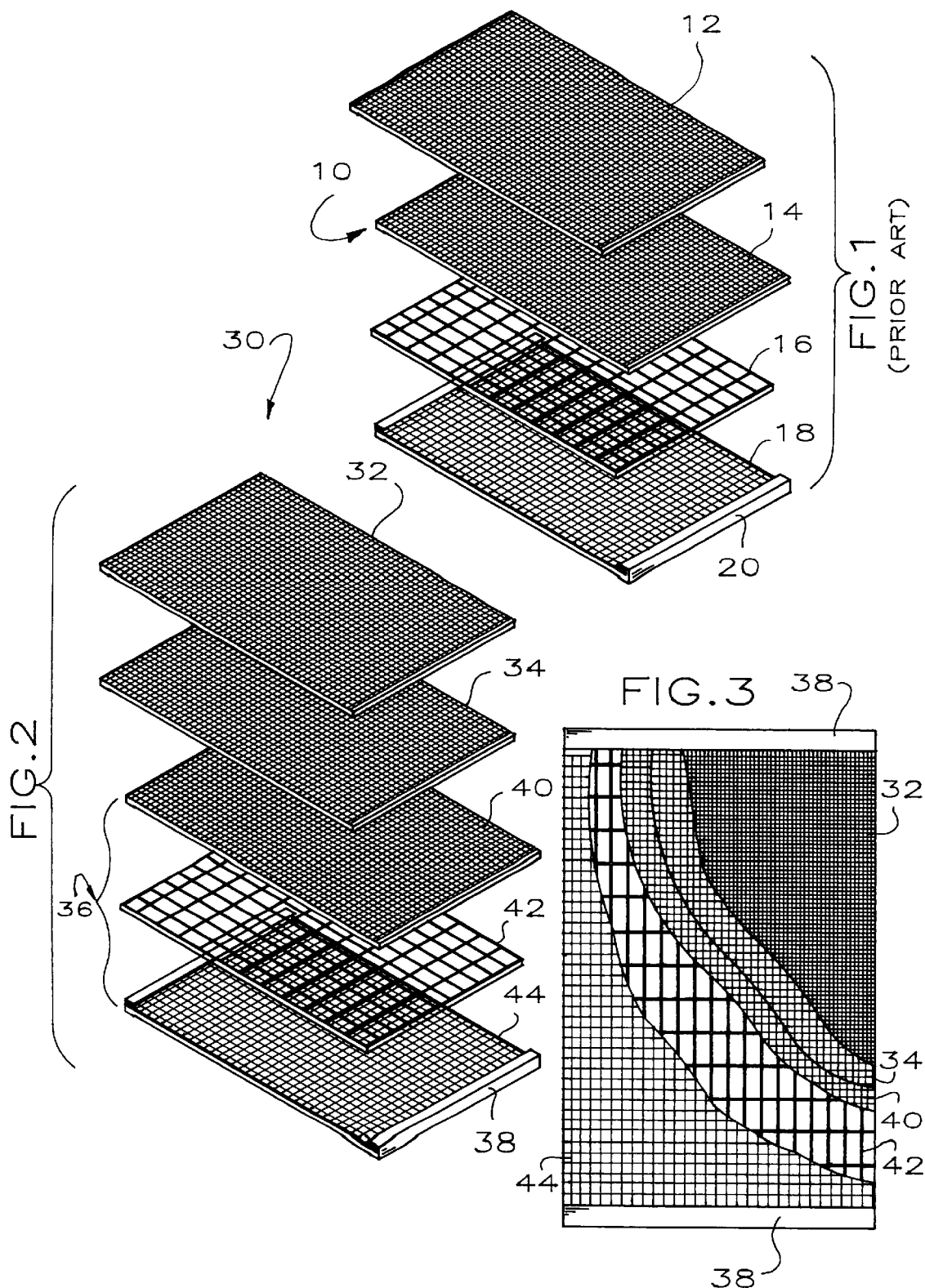

SCREEN ASSEMBLY FOR VIBRATORY SCREENING MACHINE

This invention relates to an improved screen for use in a vibratory screening machine.

BACKGROUND OF THE INVENTION

Vibratory screening machines are well known in the art and are used in a variety of situations where it is desired to remove suspended solids from a slurry. These machines include an screen assembly that is vibrated. The liquid slurry is discharged onto the screen which is typically inclined. Solids in the slurry, larger than the screen size, collect on top of the screen and migrate toward the discharge end. Solids in the slurry smaller than the screen size pass with the liquid through the screen.

A typical application of vibratory screening machines is in the drilling of oil or gas wells where these devices are known as shale shakers. Early shale shakers incorporated a single inclined vibrating layer of hardware cloth having a mesh opening of 1/4–3/8". Drilling mud coming from the well discharged onto the inclined screen. Large shale particles collected on top of the hardware cloth and travelled down the incline into a shale pit. The liquid drilling mud and the bulk of the entrained solids passed into the mud system.

Substantial improvements have been made in vibratory screening machines so very small solids are now capable of being removed from hot drilling mud streams emitting from wells being drilled at substantial depths in the earth. Larger drilling rigs are equipped with sophisticated mud systems that treat the drilling mud to perform its various tasks. A typical large drilling rig includes a shale shaker mounted on a mud tank so the removed solids are discharged into a shale pit adjacent the mud tank and the liquid mud passing through the shale shaker falls into the mud tank where it is treated by monitoring of various properties, by adding various chemicals and by using other solids removal techniques.

When starting the drilling of a land based well, however deep, the surface hole is drilled with a combination of water and bentonite gel which combines with drilled solids to make a native drilling mud. This type mud is not expensive and is not treated in a costly manner. When drilling the surface hole, the screen assemblies on the shake shaker are selected to have rather large mesh so that only fairly large solids are removed from the mud stream. Because the screen assemblies have large mesh screen, they have screen wire of substantial diameter and are accordingly robust and operate satisfactorily for substantial lengths of time.

As the well is deepened, the drilling mud is treated with more expensive chemicals and more care is taken to control the amount and size of solids in the recirculated mud. In the drilling of a typical deep well, one or more strings of intermediate pipe are cemented in the hole to provide protection against blow outs. Typically, more expensive mud types are used following the setting of intermediate strings. For example, it is common in parts of South Texas to drill a well with a water based gel mud until an intermediate string of pipe is set and then change over to an oil based invert emulsion. These oil based emulsions are considerably more expensive than the water based mud used to drill the shallower part of the hole. Considerably more care is taken to remove solids from more expensive muds, of which oil based invert emulsions are typical.

The screen assemblies in shale shakers are accordingly changed during drilling of wells to provide larger mesh, less expensive, more durable screen assemblies when drilling the shallow part of the hole and smaller mesh, more expensive, less durable screen assemblies when drilling the deeper part of the hole. The trend, over time, has been to use finer and finer mesh screens when using expensive muds. The finest screen mesh presently employed in screen assemblies is on the order of 210–250 mesh, which means there are 210–250 strands of wire per inch. A conventional 210 mesh screen will remove solids larger than 74 microns from drilling mud.

There are presently two types of screen assemblies employed in sophisticated vibratory screening machines used as shale shakers. One type employs a rigid metal plate as a support for the screens. A second type employs a perforate plastic sheet or grid and a single screen as a support.

As shown in FIG. 1, a prior art screen assembly 10 includes a fine mesh screen 12, a blinding screen 14, a plastic grid or mesh 16 and a load bearing screen 18. The elements 12, 14, 16, 18 are put into a heated press where the temperature softens the plastic mesh 16 and an applied pressure squeezes the screens 12, 14, 18 into the plastic mesh 16, or vice versa, thereby bonding the layers together to provide a unitary structure. A conventional edge structure or channel 20 is incorporated with the screens so the assembly can be placed into a conventional vibratory screening machine. Screen assemblies of this construction have proved suitable for use in the shallower part of hole where the upper screen 12 is on the order of 120 mesh or coarser. Screen assemblies made in this manner using finer mesh screens have not proved suitable because they are not sufficiently durable, wear out too quickly and are thus too costly.

Disclosures of interest relative to this invention are found in U.S. Pat. Nos. 4,033,865; 4,575,451; 5,221,008; 5,330,057; 5,417,859 and 5,673,797.

SUMMARY OF THE INVENTION

In this invention, the load bearing or support assembly for the operative screens comprises two or more screens. In one embodiment of this invention, an upper fine mesh screen is underlain by a coarser blinding screen. These screens are underlain by a load bearing assembly comprising a first support screen coarser than the blinding screen, a plastic mesh and a second support screen coarser than the first support screen. The screens and plastic mesh are placed in a heated press where the plastic is softened and pressure is applied to distort the plastic and bond the screens and plastic together. A channel or edge structure is attached to the screens so the assembly fits into a conventional vibratory screening machine or shale shaker.

In use, the upper fine mesh screen rejects the oversized particles and passes the finer particles and liquid, the blinding screen acts to dislodge any particles sticking in the mesh of the upper screen and the load bearing assembly supports the upper screens against the forces imparted by the liquid passing through the screens and by the vibration of the screen assembly. This construction has proved to be substantially more durable than fine mesh prior art screen assemblies incorporating a screen support and has proved comparable to screen assemblies incorporating a rigid metal plate support.

It is an object of this invention to provide an improved screen assembly for use in a vibratory screening machine.

Another object of this invention is to provide an improved screen assembly which incorporates an improved support for the operating screens.

A more specific object of this invention to provide an improved screen assembly incorporating at least two screens in a load bearing assembly used to support a fine mesh screen and a blinding screen.

Another more specific object of this invention is to provide an improved screen assembly incorporating a planar screen support for an undulating screen layer.

These and other objects and advantages of this invention will become more fully apparent as this description proceeds, reference being made to the accompanying drawings and appended claims.

BRIEF DESCRIPTION OF THE DRAWINGS

FIG. 1 is an exploded isometric view of a prior art screen assembly;

FIG. 2 is an exploded isometric view of a screen assembly of this invention;

FIG. 3 is a top view of the screen assembly of FIG. 2, certain parts being broken away for clarity of illustration.

DETAILED DESCRIPTION

Referring to FIGS. 2–3, a screen assembly 30 of this invention comprises an upper fine mesh screen 32, a blinding screen 34, a load bearing assembly 36 and an edge structure 38. If only one screen were employed in the screen assembly 30, the upper fine mesh screen 32 would control the cut point of the particles rejected by the assembly 30 because the size of the openings in the screen 32 would dictate the size particles that pass through the assembly 30. In a multilayer screen, this is somewhat more complicated because the wires of the blinding screen 34 and assembly 36 cross the openings of the screen 32 and make a more complex shape for the particles to pass through. This is well recognized in the art and screens are now characterized by a more complicated rating system which show the proportion of particles of various size that pass through the screen. Screens now have D50, D16 and D84 rating numbers which show, respectively, the diameter of spherical particles where 50% of the particles pass through the screen, 16% of the particles pass through the screen and 84% of the particles pass through the screen. Even so, it is the size of the openings in the screen 32 that basically dictates the size of particles rejected by the screen assembly 30. There is a clear relationship between the size of the particles that will pass through the screen 32 and the durability of the screen 32. The finer the screen mesh, the less durable the screen is because the wires are of smaller diameter. This may be seen in Table II below. This is clearly apparent from the finer mesh screens now in use. Screens of 210–250 mesh have wires that are so small that the unsupported screens are no stronger than a paper towel. Screens of 210–250 mesh are so slick they feel like plastic sheet.

The purpose of the blinding screen 34 is to dislodge particles that become stuck in the openings of the upper screen 32. This technique is shown in U.S. Pat. No. 4,033,865 and is now well know. The blinding screen 34 is of coarser mesh than the upper screen 32.

The purpose of the load bearing assembly 36 is to support the upper screen 32 and the blinding screen 34. To this end, the load bearing assembly 36 includes a first support screen 40, a plastic mesh or perforate sheet 42 and a second support screen 44. The first support screen 40 is coarser than the blinding screen 34 and the second support screen 44 is coarser than the first support screen 40. This is much preferred because abrasion of the screens is reduced by making them progressively of larger mesh. For example, if the first support screen 40 were 100 mesh, then support screen 44 should be of larger mesh, e.g. 10 mesh.

The plastic mesh 42 is of a conventional type and is conveniently of polyethylene, polypropylene or other heat fusible plastic. The openings are of a size and spacing so that the open area of the plastic mesh 42 is considerably larger than the plastic area. The plastic mesh 42 may start out between the first and second support screens 40, 44 or may be located on the top or the bottom of the load bearing assembly 36. Before being put into the press and heated, it is easy to see where the plastic mesh 42 is located. After being bonded to the screens 32, 34, 40 and 44, it is more difficult to see whether the plastic mesh 42 is above or below an adjacent layer because the layers are fused together.

The selection of the meshes for the various screens 32, 34, 40 and 44 depend on the circumstances where a particular screen assembly 30 is to be used. As mentioned previously, drilling the shallower part of the hole is done with a screen assembly of larger mesh, as suggested by the typical situations shown in Table I:

TABLE I

Mesh size selection

| mud type | mesh size | | | |
|---|---|---|---|---|
| | screen 32 | screen 34 | screen 40 | screen 44 |
| native gel mud | 50–84 | 38–50 | 10–20 | |
| lignosulfonate mud | 140–175 | 50–84 | 30–50 | 10–30 |
| invert oil emulsion | 210–250 | 100–150 | 30–50 | 6–20 |

It will be seen that the screen used with native gel mud is the prior art screen shown in FIG. 1. Those skilled in the art will equate native gel muds with drilling the surface hole, lignosulfonate muds as drilling an intermediate section of the hole and invert oil emulsions with drilling the deeper part of a hydrocarbon well.

There is a conventional relationship between the size of the wire employed in a screen and the mesh of the screen. As will be evident, the diameter of the wires employed in a screen become smaller as more wires are used per inch of screen. This relationship may be seen in Table II:

TABLE II

Relationship between mesh size and wire diameter

| mesh size | wire diameter |
|---|---|
| 5 | .179" |
| 25 | .014" |
| 100 | .0045" |
| 200 | .0021" |

Prototypes of the screen assembly 30 have been used in field conditions and have proved of considerably more durable than screen supported assemblies 10 of the prior art shown in FIG. 1, as shown in Table III:

TABLE III

Comparison of Operating Life of Typical Screen Assemblies

| | Screen Assembly 10 | Screen Assembly 30 |
|---|---|---|
| native mud, shallow depth | 24–36 hours | |
| lignosulfonate mud, med. depth | 36–72 hours | 96–336+ hours |
| invert oil emulsion, deep | <48 hours | 96–300+ hours |

Although this invention has been disclosed and described in its preferred forms with a certain degree of particularity, it is understood that the present disclosure of the preferred forms is only by way of example and that numerous changes in the details of operation and in the combination and arrangement of parts may be resorted to without departing from the spirit and scope of the invention as hereinafter claimed.

I claim:

1. A screening screen assembly comprising an upper fine mesh first screen, a fine screening blinding screen, below the upper screen, of coarser mesh than the upper screen, and a load bearing assembly for the upper and blinding screens, below the blinding screen, including a first support screen of coarser mesh than the blinding screen, a perforate plastic mesh and a second support screen of coarser mesh than the first support screen, the upper screen, the blinding screen, the first support screen and the second support screen are generally flat and parallel, the screens being bonded together by deforming the perforate plastic mesh into bonding contact with the screens, the flow path through the screen assembly being through the upper screen, through the blinding screen and then through the load bearing assembly.

2. The screening screen assembly of claim 1 wherein the upper fine mesh screen has a mesh of 140–250.

3. The screening screen assembly of claim 2 wherein the blinding screen has a mesh of 50–150.

4. The screening screen assembly of claim 3 wherein the first support screen has a mesh of 30–50.

5. The screening screen assembly of claim 4 wherein the second support screen has a mesh of 6–30.

6. The screening screen assembly of claim 5 wherein the plastic mesh is a heat fusible plastic.

7. The screening screen assembly of claim 6 wherein the load bearing assembly comprises the first support screen abutting the blinding screen, the plastic mesh lying between the first and second support screens.

8. The screening screen assembly of claim 7 further comprising an edge structure on selected edges of the screening screen assembly for attachment to a vibratory screening machine.

9. The screening screen assembly of claim 8 wherein the edge structure comprises a channel on two opposite edges of the screening screen assembly.

10. A screening screen assembly comprising an upper fine mesh first screen having a mesh between 140–250, a fine screening blinding screen, below the upper screen, of coarser mesh than the upper screen; and a load bearing assembly for the upper and blinding screens, below the blinding screen, including a first support screen of coarser mesh than the blinding screen and having a mesh between 30–50, a perforate plastic mesh and a second support screen of coarser mesh than the first support screen having a mesh between 6–30, the screens being bonded together by deforming the perforate plastic mesh into bonding contact with the screens, the flow path through the screen assembly being through the upper screen, through the blinding screen and then through the load bearing assembly, the upper screen, the blinding screen, the first support screen and the second support screen are generally flat and parallel.

\* \* \* \* \*